United States Patent
Blakeslee et al.

(10) Patent No.: US 6,708,476 B1
(45) Date of Patent: Mar. 23, 2004

(54) SICKLE CUTTERBAR ASSEMBLY

(75) Inventors: Edward A. Blakeslee, Ephrata, PA (US); Emmett F. Glass, Akron, PA (US)

(73) Assignee: New Holland North America, Inc., New Holland, PA (US)

(*) Notice: Subject to any disclaimer, the term of this patent is extended or adjusted under 35 U.S.C. 154(b) by 0 days.

(21) Appl. No.: 10/319,353

(22) Filed: Dec. 14, 2002

(51) Int. Cl.[7] .................................................. A01D 34/13
(52) U.S. Cl. .......................................... 56/296; 56/257
(58) Field of Search .................... 56/296, 257, 298, 56/259, 305, DIG. 17, DIG. 20, 299, 307, 308, 309, 310, 311

(56) References Cited

U.S. PATENT DOCUMENTS

| | | | |
|---|---|---|---|
| 3,577,716 A | 5/1971 | McCarty et al. ............... 56/259 |
| 4,216,641 A | 8/1980 | Koch et al. ................... 56/14.4 |
| 4,236,370 A | 12/1980 | Shaver ......................... 56/297 |
| 4,246,742 A | 1/1981 | Clark et al. ................... 56/259 |
| 4,644,738 A | 2/1987 | Krambeck et al. ............ 56/259 |
| 4,660,361 A | 4/1987 | Remillard et al. ............. 56/297 |
| 5,024,051 A | 6/1991 | Glass et al. ................... 56/297 |
| 6,062,012 A | 5/2000 | Suarez et al. ................. 56/257 |
| 6,116,010 A * | 9/2000 | Salley .......................... 56/257 |
| 6,510,681 B2 * | 1/2003 | Yang et al. ................... 56/298 |

* cited by examiner

Primary Examiner—Árpád Fábián Kovács
(74) Attorney, Agent, or Firm—John William Stader; Collin A. Webb

(57) ABSTRACT

An adjustable double sickle cutterbar assembly using sickle bar hold-downs that minimizes the interference to the flow of cut crop material rearwardly in the header, thus to reduce the catching of cut crop material.

11 Claims, 9 Drawing Sheets

SICKLE CUTTERBAR ASSEMBLY

CROSS-REFERENCE TO RELATED APPLICATIONS

The invention is this application is related to those disclosed and claimed in U.S. application Ser. Nos. 10/319,292, 10/319,291, and 10/319,355 entitled, respectively, "Adjustable Hold-Down for Sickle Guards", "Mechanism to Prevent Misalignment of Hold-Down, and "Stud Plate for Sickle Bar Hold-Down". All of these applications were filed on the same date as the instant application and all have the same inventors.

BACKGROUND OF THE INVENTION

The present invention relates generally to a mowing apparatus of the reciprocating sickle type and more particularly to double sickle cutterbar with improved operational characteristics.

The general construction and mode of operation of reciprocating sickle cutterbar mowing apparatus is well known, as is the importance of making a smooth and sharp cut of crop material across the full width of the swath being harvested. In a continuing process, the trend in agricultural harvesting machine design has been to develop larger machines that result in increased operational efficiency. This trend has resulted not only in larger and wider harvesters, but also increased ground speed, particularly in the design of combines, forage harvesters and windrowers.

These machines typically employ a sickle cutterbar as the means for severing the crop material from the ground. It has been, however, discovered is that by increasing the width of cut of a sickle cutterbar, problems arise because the increased length and speeds are opposed by a practical limit of the energy that can be alternatively applied to and extracted from individual reciprocating sickle assemblies, since the longer sickle assemblies and the higher operating speeds increase this energy transfer to the point where supporting forces become excessively amplified and destructive vibrations are generated.

One successful approach to alleviating this problem was to make the sickle cutterbar in two separately driven pieces, partially overlapping to prevent leaving a strip of uncut crop materials. This approach is shown and described, for example, in more detail in U.S. Pat. Nos. 3,577,716 and 5,024,051. The structures shown in the patents identified immediately above, and other similar structures, have seen several improvements through the years; however, current similar structures still exhibit disadvantages in design that make them difficult to set up and adjust, and that cause them to "catch" crop material during operation and thereby interrupt the smooth flow of cut crop material rearwardly for conditioning or further treatment.

It would be quite advantageous to have a double sickle cutterbar that overcomes the problems mentioned above.

SUMMARY OF THE INVENTION

Accordingly, it is an object of the present invention to provide a sickle cutterbar assembly that is easy to set up and adjust.

Another object of the present invention is to provide a sickle cutterbar assembly that minimizes the interference to the flow of cut crop material rearwardly in the header.

It is another object of the instant invention to provide a double sickle cutterbar assembly that uses an improved hold-down design to reduce the "catching" of cut crop material.

It is yet another object of this invention to provide an improved sickle cutterbar assembly that is durable in construction, inexpensive of manufacture, carefree of maintenance, facile in assemblage, and simple and effective to set up, adjust and use.

These and other objects are attained by providing an improved double sickle cutterbar assembly using sickle bar hold-downs of improved design and other improved assembly elements that result in significantly reduced "catching" of cut crop material and thus improved feeding from the cutterbar to other operational elements of the header/harvester.

DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT

Figure 1:
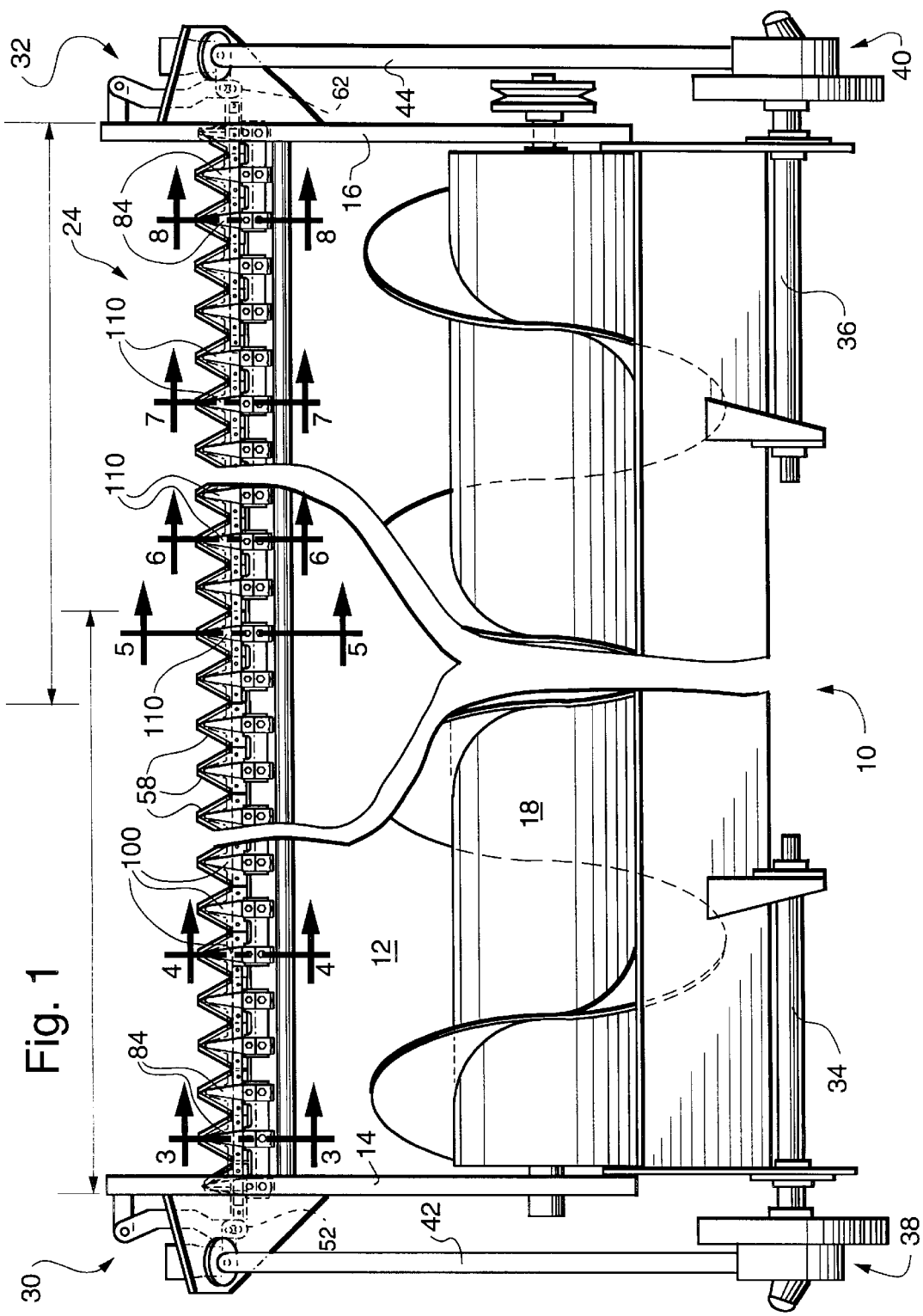
FIG. 1 is a partial top plan view of a sickle cutterbar header.

Referring now to FIG. 1, a crop-harvesting header 10 is generally shown to include a lower support/guide shield 12 covering the expanse between side frame members 14 and 16. Because such a header is well known in the art, only major components are shown in the drawings to simplify the presentation and understanding. Shield 12 extends from the lower part of the header rearwardly to a crop conditioning unit or other mechanism for further harvesting or treating the cut crop. In this exemplary header, an auger 18 works in conjunction with shield 12 to consolidate the cut crop material prior to conveyance rearwardly for further treatment. As can perhaps best be seen by reference to FIG. 3, the forward end of shield 12 is strengthened by the addition of a angular member 20 that extends substantially along the full forward edge of the shield and welded thereto. Additionally, the upward bend in the forward end of shield 12 adds strength thereto and a protruding lip 22 provides a convenient location to attach cutterbar assembly 24.

Cutterbar assembly 24 is generally comprised of two elongate sickle assemblies that are separately driven for reciprocal movement at the outer ends thereof by drive mechanisms 30, 32.

To best understand the structure of the cutterbar assembly to be described herein, it would first be convenient to look at the three applications identified above under the section entitled "Cross-Reference to Related Applications". All three of those applications are hereby incorporated herein in their entirety by reference. The incorporated applications disclose the improved hold-down, the stud plate and the misalignment prevention mechanism that will be discussed briefly in reference to the novel cutterbar assembly herein shown.

Figure 2A:
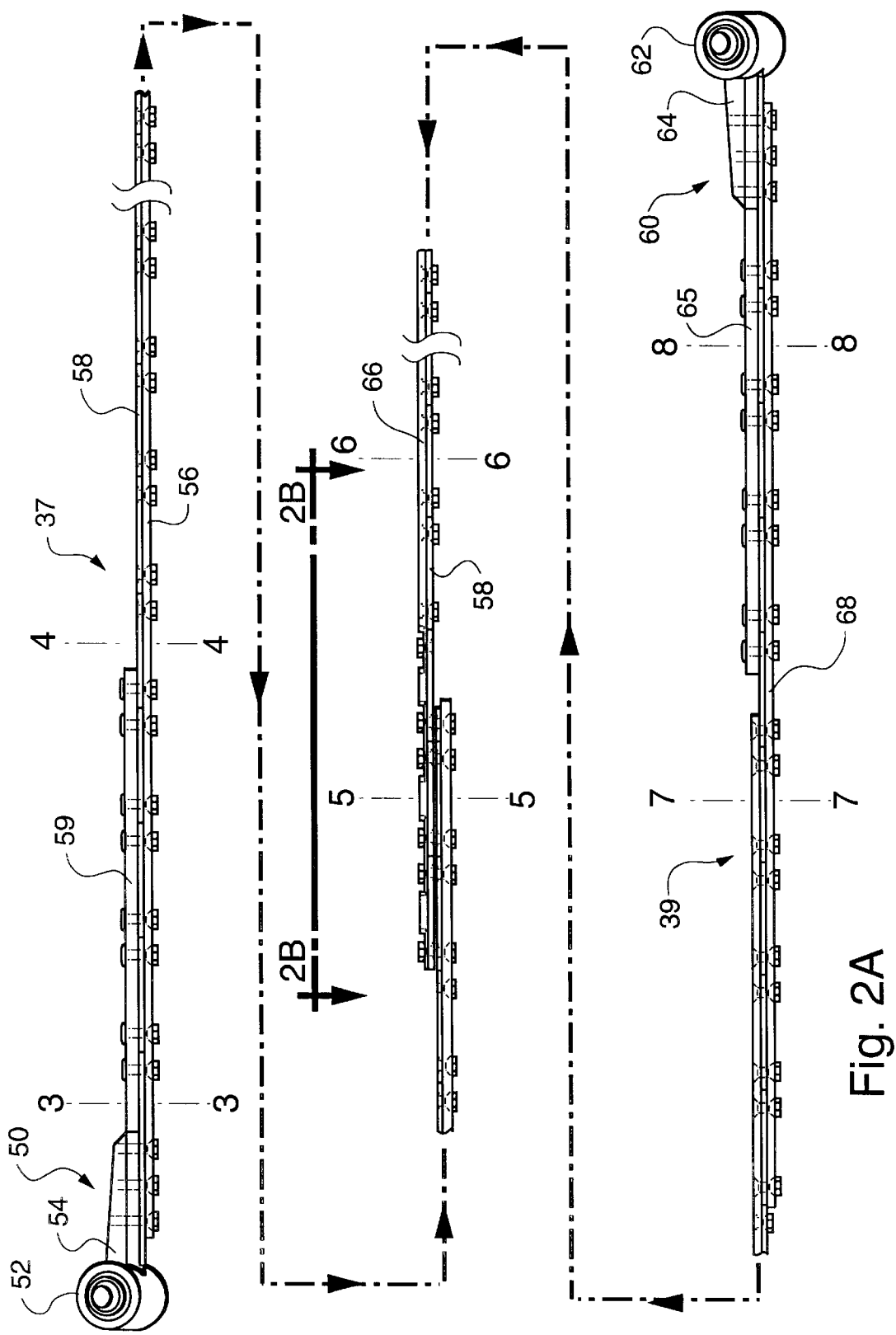
FIG. 2A is a fragmentary view, in elevation, of the two sickle assemblies making up part of the overall cutterbar assembly shown in FIG. 1.

FIG. 2A is a fragmentary view of the two sickle assemblies, a left assembly 37 and a right assembly 39, that make up a significant part of the novel overall cutterbar assembly of the instant invention. For clarification, the reference lines, 3—3, 4—4, etc. of FIG. 2A correspond in location to the sectional lines 3—3, 4—4, etc. of FIG. 1. A pair of known wobble drive assemblies includes shafts 34, 36 mounted on the upper, rearward portion of header 10, as shown in FIG. 1. Mounted on the outer ends of drive shafts 34, 36 are a pair of wobble drive units 38, 40. The rotary input motion from the power source is transmitted through the drive shafts 34, 36 to the wobble units 38, 40, which, in turn, convert the rotary power input into an oscillatory output motion. The operation of a wobble drive unit is well known in the art and forms no part of the present invention and, therefore, will not be described in detail.

The oscillatory output motion from the wobble drive units is transmitted to the driving shafts 42, 44 that are connected by their upper ends to the wobble drive units 38, 40, respectively, in a manner well known in the art. In this manner, the driving shafts are caused to oscillate. The lower ends of the driving shafts 42, 44 connect to drive mechanisms 30, 32 such that the oscillatory motion is transferred to the respective sickle assemblies 37, 39.

In FIG. 2A it can be seen that the left sickle assembly 37 is the simpler of the two, and includes a left hand drive subassembly 50, itself made up of bushing 52 (for attachment to the drive mechanism 30) with an integral arm 54 extending away from the bushing. The remainder of the left hand sickle assembly is comprised of an elongate one-piece knife back 56, a series of knife sections 58 extending along the length of the knife back 56, and a support bar 59 extending part way along the left end of the length of the knife back. When these components are bolted together as shown, the left end, i.e., the driven end, of this sickle assembly is fairly rigid and quite capable of transferring the required continuous power along the assembly to perform its required function. It is an important feature of the instant invention that the cutterbar assembly minimize areas, locations or structural characteristics where cut crop material may "catch" and build up to the point where they interfere with the smooth flow of crop material. While bolts, rivets and the like are necessary in a cutterbar assembly, the bolts may have countersunk heads and low profile nuts, as shown in this FIG. 2A.

The right hand sickle assembly 39 is, as indicated above, more complex than the left hand assembly. There are several reasons for this complexity, but all of them derive from the fact that in order to have an overlapping double sickle assembly, the two cannot be in the same plane—otherwise, they would not overlap, but would either hit each other end-to-end and/or leave a strip of uncut crop material. To permit the overlapping, the right hand layer of knife sections are higher than the left by an amount approximately equal to the thickness of the knife sections, i.e., about ⅛ inch. In this unit, there is a right hand drive subassembly 60 comprised of a bushing 62 (for attachment to the drive mechanism 32) with an integral arm 64 extending away from the bushing and affixed to support bar 65. In order to have the knife sections of the two sickle assemblies in a cutting relationship in the overlap area, the right hand unit must have the knife back 66 on top of the knife sections 58 which are the same as those in the other sickle assembly. With the knife back 66 on top of the knife sections, it cannot run the full length of the assembly—because of interference with support bar 65. Thus, the knife back 66 is shortened, and a secondary knife section 68 is located on the opposing side of the knife sections 58, and is of sufficient length to rigidly affix knife back 66 to the support arm 65, but not so long as to enter into the area of overlap where it would cause interference. Again, the bolts used to hold the components together are countersunk and selected to reduce exposed areas where cut crop material can "catch" and build up.

Figure 2B:
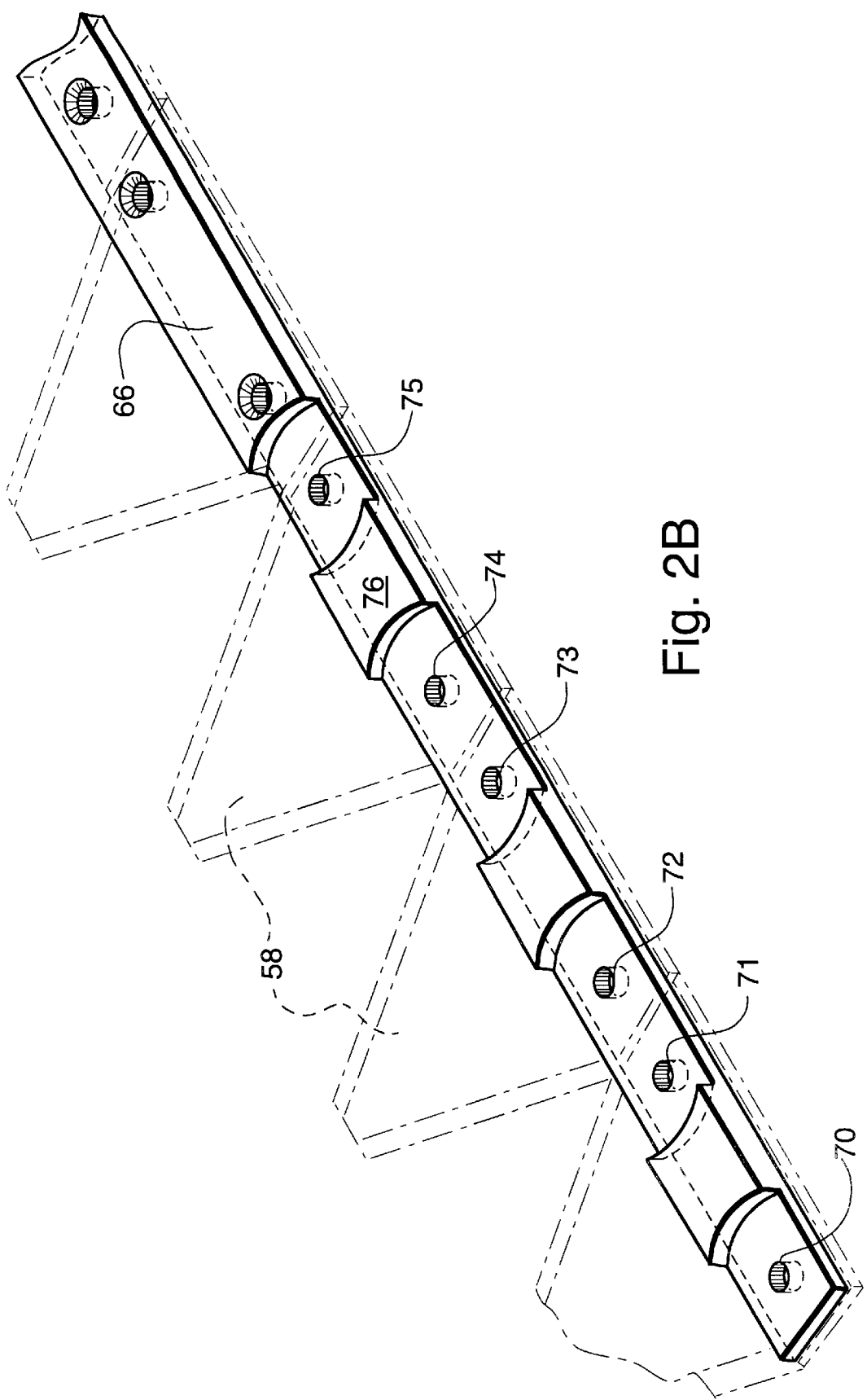
FIG. 2B shows the machining detail of the right hand knife back in the area of overlap indicated by the lines 2B—2B in FIG. 2A.

FIG. 2B shows a special design for the right hand sickle assembly knife back 66 to minimize the "catching" of cut crop materials, yet rigid enough to maintain its function. The last six bolt holes (shown as 70–75), those which cover the area of overlap, have been machined so that the nuts on the bolts used will minimally protrude above the upper surface 76 of knife back 66.

Figure 3:
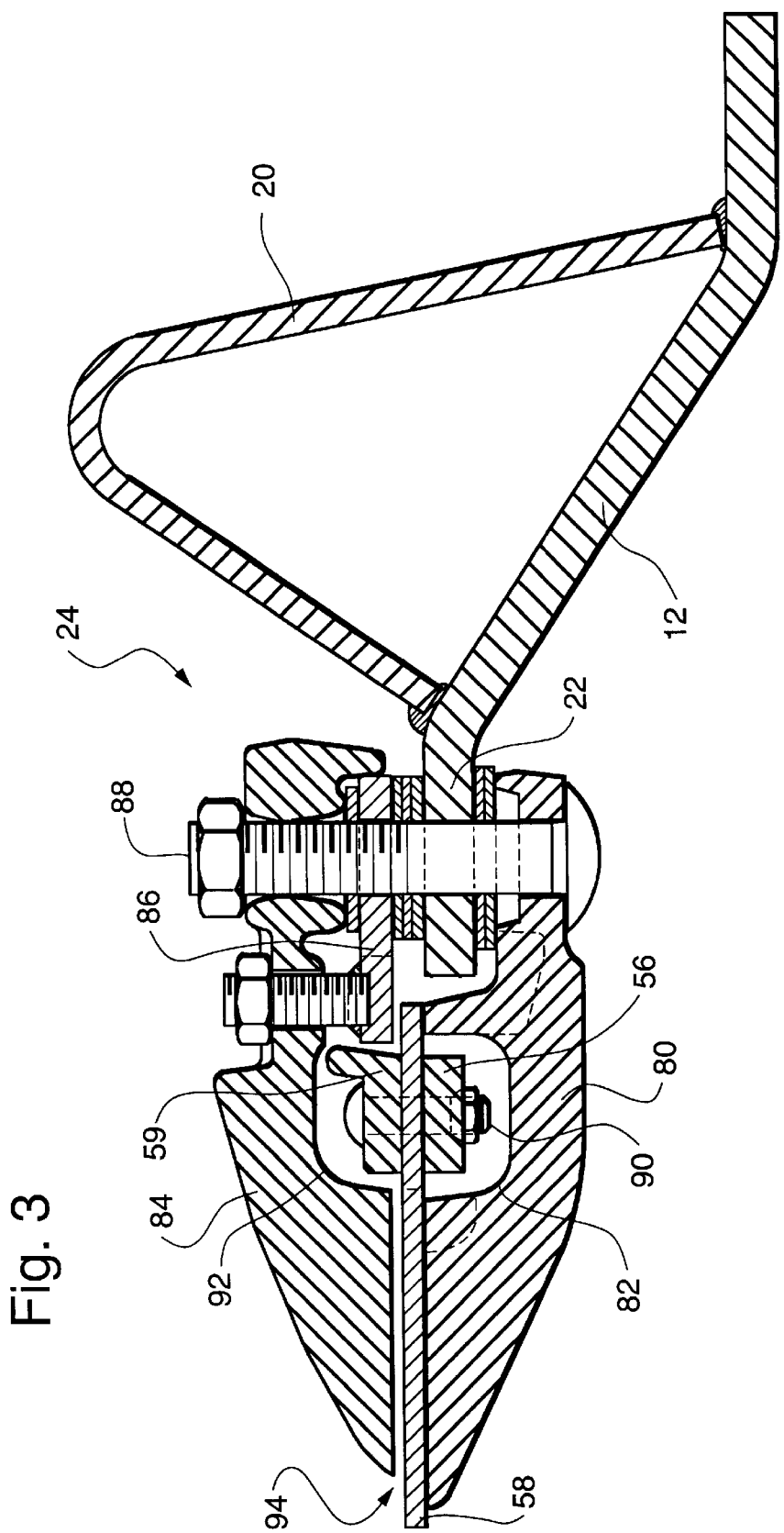
FIG. 3 is a cross-sectional view of the cutterbar assembly taken along lines 3—3 of FIG. 1.

FIG. 3 is a cross-sectional view of the cutterbar assembly toward the left end thereof. It shows a sickle guard 80 with a transverse slot 82 therein, an adjustable hold-down 84 and stud plate 86, both as shown in the incorporated applications, and a bolt 88 holding the assembly together and affixing it to the shield 12. As is known in the art, a plurality of knife sections 58 are affixed to a knife back 56. The left hand sickle assembly is reciprocated by drive 30 which is attached to support bar 59, shorter than the knife back, also affixed to the knife sections and knife back by a plurality of bolts 90. Hold-down 84 has a transverse slot 92 therethrough of sufficient size to allow the support arm 59 to freely reciprocate therethrough. In this manner, the knife sections of the left hand sickle assembly of the cutterbar assembly are reciprocated lengthwise along the cutterhead and in the gap 94 between the sickle guards 80 and the hold-downs 84 in a manner to cut the standing crop material. Transverse slots 82 and 92 are designed to accept the hardware moving therethrough, but with a minimum of excess space. This is one area of other cutterbars where crop materials can and do "catch" to cause a buildup that interferes with the desired flow of crop material. By minimizing the slot sizes relative to the sickle assembly, "catching" is significantly reduced. Also, the bolts used to hold the support arm 59 and knife back to the knife sections are selected to reduce the buildup of crop materials.

Figure 4:
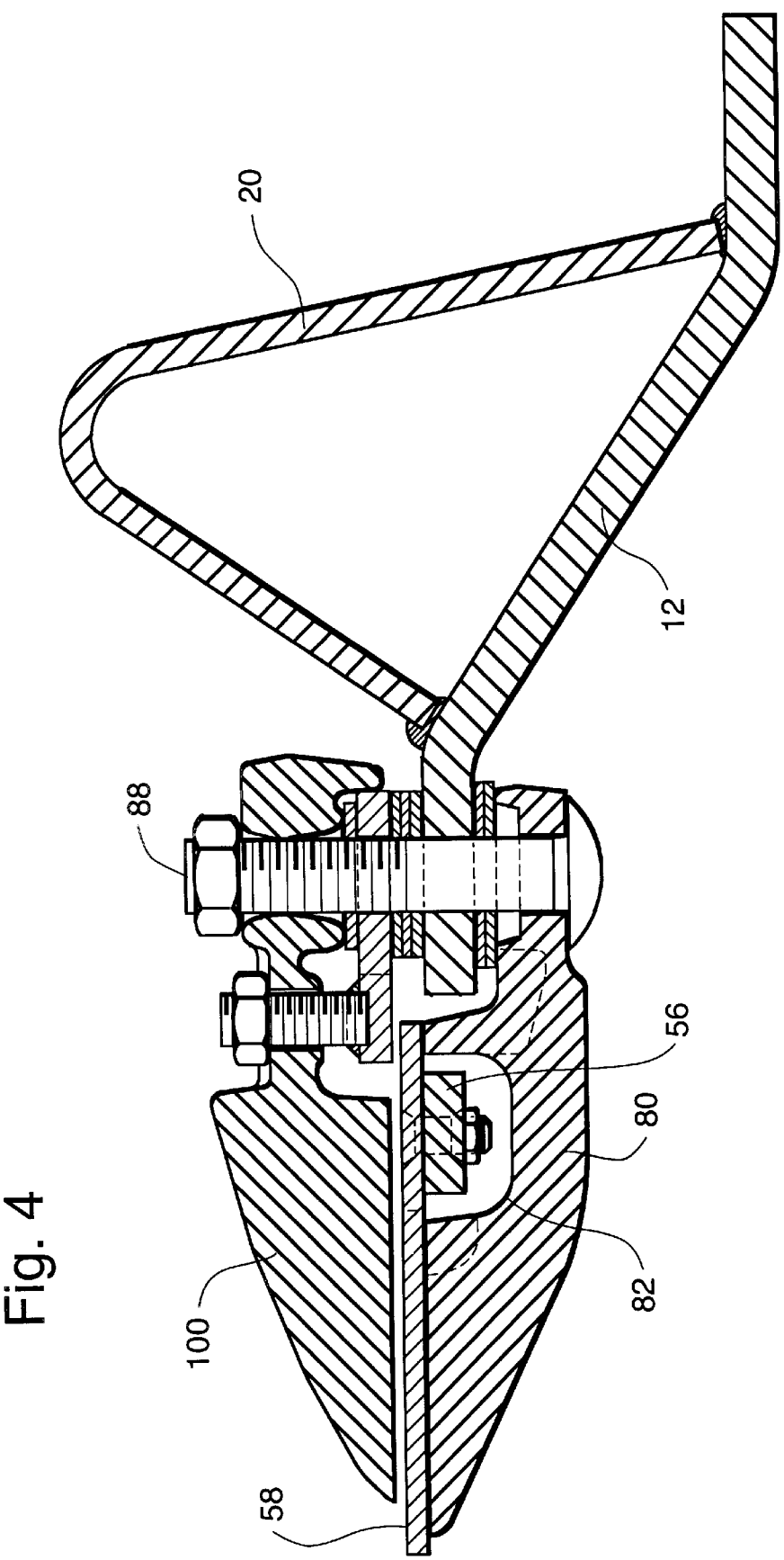
FIG. 4 is a cross-sectional view of the cutterbar assembly taken along lines 4—4 of FIG. 1.

FIG. 4 is a cross-section of the left hand side of the cutterbar assembly, more toward the center than that of FIG. 3. In FIG. 4 it can be seen that the support arm 59 has ended, i.e., does not extend from the left end to the point of this cross-sectional view. Therefore, there is no transverse slot in hold-down 100 to "catch" crop material, and the knife sections are supported only by knife back 56.

Figure 5:
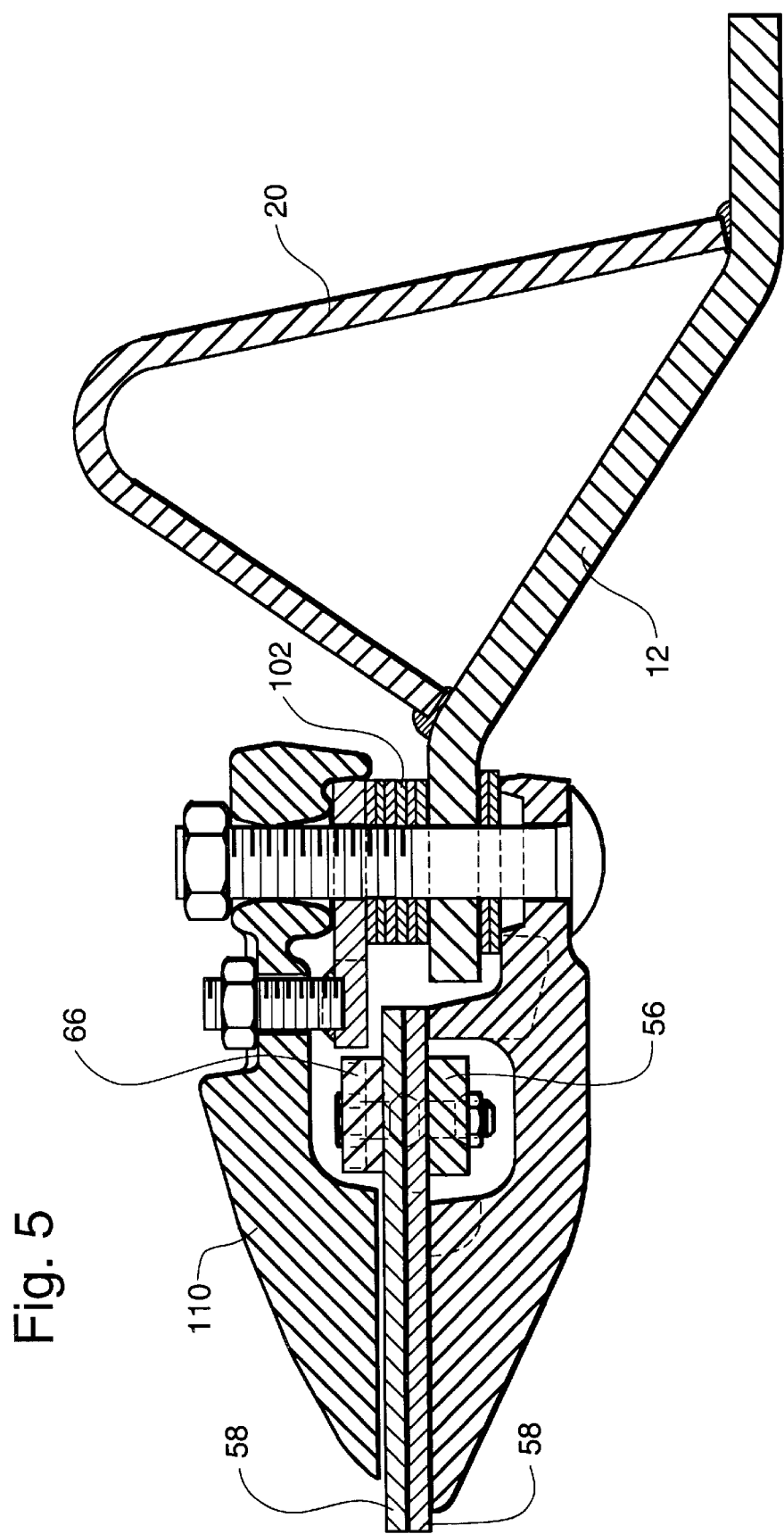
FIG. 5 is a cross-sectional view of the cutterbar assembly taken along lines 5—5 of FIG. 1.

FIG. 5, which will be discussed in further detail below, generally shows the overlapping right and left hand sickle assemblies.

Figure 6:
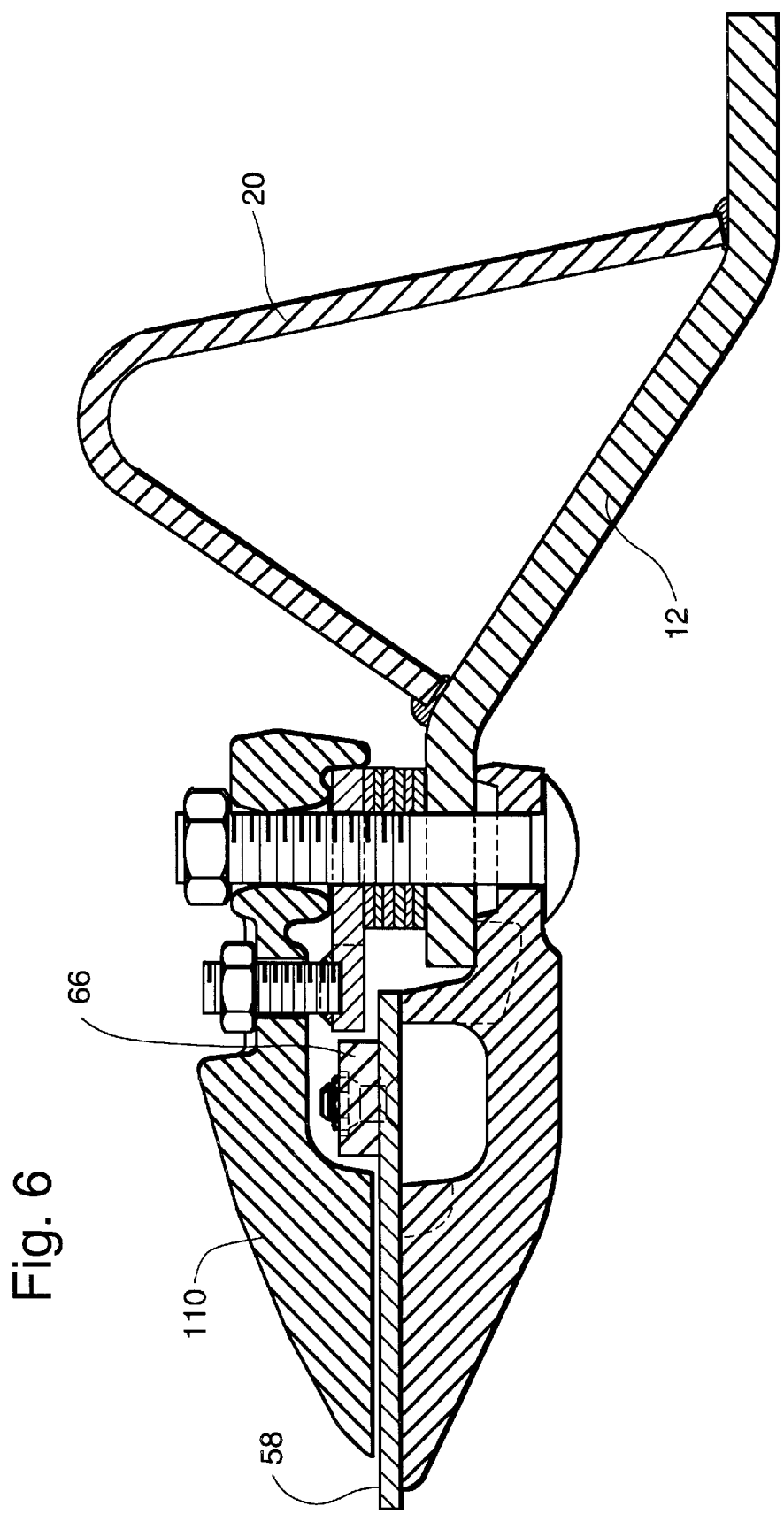
FIG. 6 is a cross-sectional view of the cutterbar assembly taken along lines 6—6 of FIG. 1.
Figure 7:
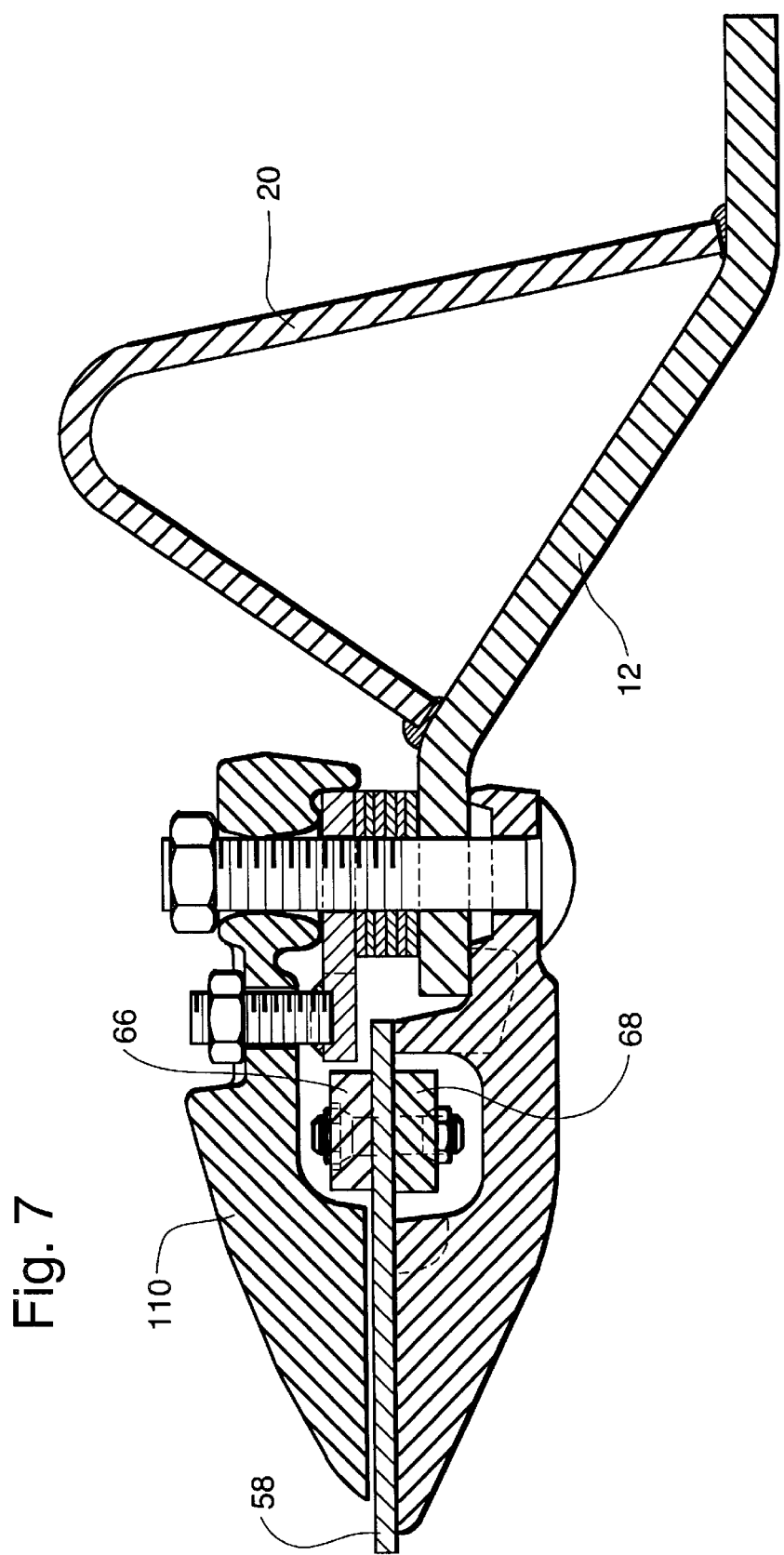
FIG. 7 is a cross-sectional view of the cutterbar assembly taken along lines 7—7 of FIG. 1.
Figure 8:
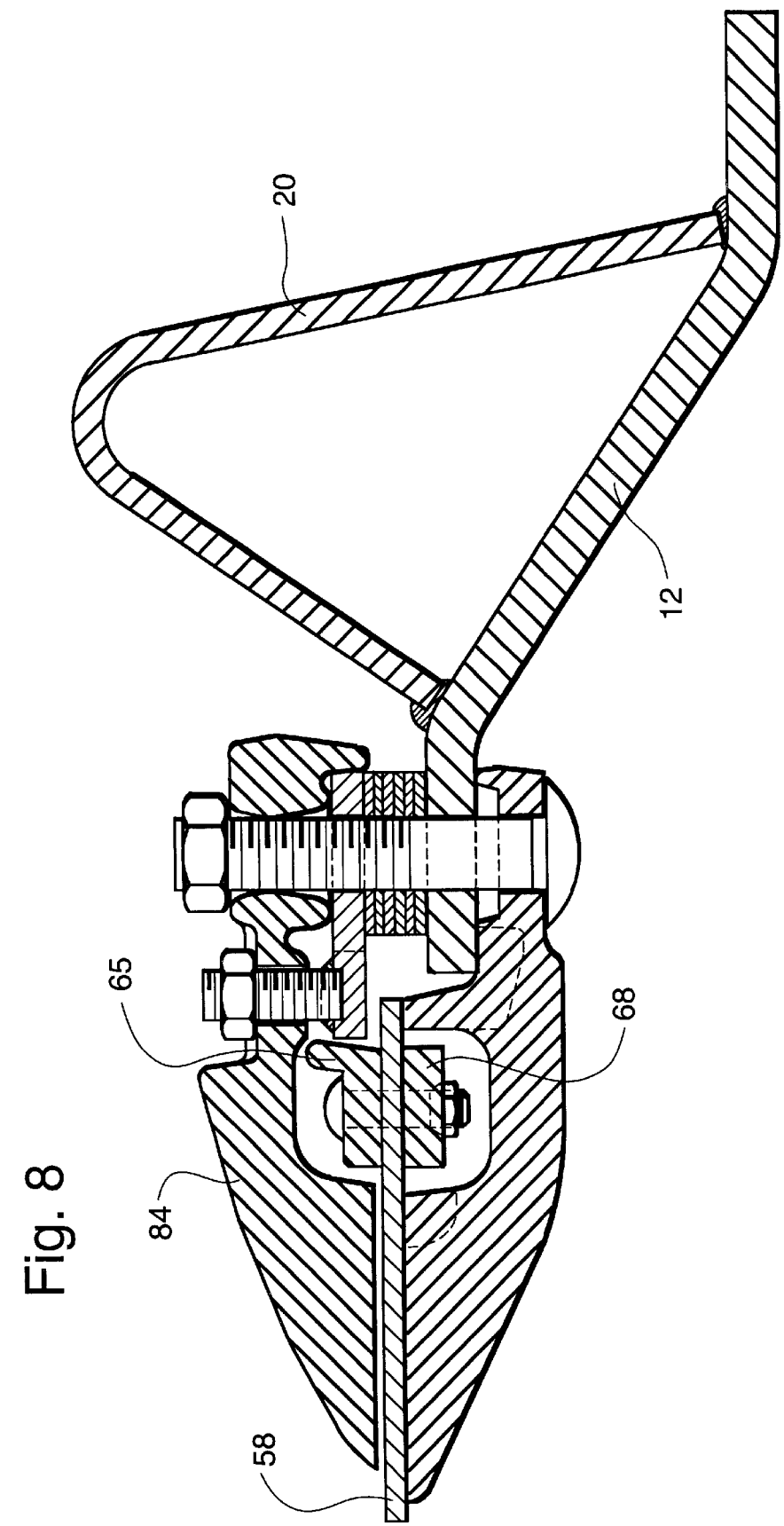
FIG. 8 is a cross-sectional view of the cutterbar assembly taken along lines 8—8 of FIG. 1.

FIGS. 6–8 are provided to further show, in cross-section, differences between the right hand side of the cutterbar assembly and the left. As described above, the right hand sickle assembly has a partial knife back on top and a partial knife back on the bottom. Thus, to meet the objectives of the instant invention, the hold-downs will have slots therethrough to minimize clearance of the various components. In fact, the result is that the structure described uses hold-downs with three different slot configurations—one to be used on the left and right end portions (FIGS. 3 and 8), one to be used in the mid-portion of the left hand assembly between the left end portion and the overlap (FIG. 4), and a third to be used at the overlap and to the right thereof to the right hand end portion (FIGS. 5–7). Note in FIGS. 3–8 that there are variations in the use of shims that make up the height differences brought about by the overlap arrangement.

Referring once again to FIG. 5, the center of the cutterbar assembly has two overlapping knife sections 58, 58 each supported by a different knife back, 56 and 66, respectively. Each of the two knife assemblies of the cutterhead assembly are removed by pulling them through the respective outside end of the structure, so the outside slots in the hold-downs must only be so large as to permit the largest inward structure to pass through.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions. Accordingly, the following claims are intended to protect the invention broadly as well as in the specific form shown.

Having thus described the invention, what is claimed is:

1. A mowing device comprising in combination:
a frame structure adapted for forward travel over ground having standing crop thereon, said frame structure including a flange extending forwardly along a plane generally transverse to direction of forward travel;
a cutterbar assembly mounted to said flange and extending along the transverse length of said flange from a first end to a remote second end thereof, said cutterbar assembly including:
a plurality of substantially uniform-length knife guards affixed in transverse alignment to said flange and projecting forwardly therefrom;
first and second conversely reciprocating elongate sickle bars, said first sickle bar having a first elongate knife back and said second sickle bar having a second elongate knife back, each having outboard and inboard ends and upper and lower surfaces operable within said knife guards, said sickle bars being disposed in generally transverse alignment;
said first sickle bar and said first knife back of substantial equal length greater than one-half the transverse length of said cutterbar assembly and extending generally from said first end of said cutterbar assembly toward the second end thereof;
knife elements mounted on the upper surface of said first knife back and co-operable with a plurality of said knife guards for cutting crop material, the knife elements being mounted on said first knife back in transverse alignment, the leading edges of said first and second sickle bars lying in substantially the same vertical plane;
said second sickle bar extending generally from said second end of said cutterbar assembly toward the first end thereof, said second sickle bar being disposed one knife element thickness above said first sickle bar;
said second knife back having a length less than one-half the transverse length of said cutterbar assembly and extending generally from said second end of said cutterbar assembly toward the first end thereof;
knife elements mounted on the upper surface of said second knife back and co-operable with a plurality of said knife guards for cutting crop material, the knife elements being mounted on said second knife back in transverse alignment;
a knife back extension having upper and lower surfaces mounted on the upper surface adjacent the inboard end of said second sickle bar and extending away therefrom over the inboard portion of the upper surface of said first sickle bar in transverse alignment with both said first and second sickle bars;
knife elements mounted on the lower surface of said knife back extension and co-operable with a plurality of said knife guards for cutting crop material, the knife elements being mounted on said knife back extension in transverse alignment such that said knife back extension and said second knife back sandwich a plurality of knife elements where they overlap;
the relative lengths of said first and second sickle bars being such that said knife back extension is always in an overlap position relative to the said inboard end of said first sickle bar;
a drive mechanism on said frame structure for providing oscillatory motion; and
mechanical connection apparatus connecting said drive mechanism to each outboard end of said sickle bars for transferring oscillatory motion thereto to cause reciprocation thereof.

2. The mowing device of claim 1 wherein:
each said sickle guard has at least one elongate finger-like member extending forwardly and having a first generally planar upwardly facing surface; an elongate knife back; said first and second knife backs and said knife back extension adapted to reciprocate along the length of said plurality of sickle guards such that said knife elements register with said first surfaces to cut crop material;
a plurality of elongate finger-like hold-downs, one of said finger-like hold-downs associated with each said finger-like member and having a second generally planar downwardly facing surface, said first and second surfaces forming a slot between each sickle guard and respective hold-down in which said knife elements reciprocate;
each said finger-like hold-down having a forward generally pointed end and an opposing rearward end, said rearward end being rigidly affixed to said flange at a point adjacent said rearward end of said hold-down;
each said hold-down further having a reduced transverse cross-sectional area adjacent and forwardly of said point at which said hold-down is rigidly affixed to said frame;
an adjustment mechanism interconnecting said flange and said hold-down, at a point forward of said reduced transverse cross-sectional area, to flex said hold-down about said reduced transverse cross-sectional area to modify the spacing between said second surface and said knife element.

3. The mowing device of claim 2, wherein:
said hold-down has a first vertical hole therethrough adjacent said rearward end thereof and rigidly affixed to said forward end of said frame by a first bolt.

4. The mowing device of claim 3, wherein:

said hold-down includes a second hole therethrough adjacent to and forward of said reduced transverse cross-sectional area; and said adjustment mechanism includes a second bolt through said second hole to modify the spacing between said second surface and said knife element.

5. The mowing device of claim 4, wherein:

said second bolt interconnects said hold-down and said frame.

6. The mowing device of claim 5, wherein:

said hold-own is a forging.

7. The mowing device of claim 6, wherein:

said finger-like member extends forwardly beyond said hold-down.

8. The mowing device of claim 1 wherein:

said knife elements are angled forwardly converging cutting edges, each said cutting edge intersecting with a cutting edge on the adjacent element at a rearward vertex and registering with said cutting edges of said sickle guards as said first and second sickle bars reciprocate, a plurality of hold-downs, one associated with each finger portion of each sickle guard, each said hold-down comprising:

an elongate body having a finger-like tapered front portion, and an opposing generally rectangular box-like rear portion with a width, a top surface and an opposing bottom surface, said front portion including a lower generally horizontal planar surface corresponding to part of said bottom surface and adapted to align with a sickle guard and knife element;

at least one hole through said elongate body for affixing the hold-down to a sickle bar; and said bottom surface of said rear portion of said elongate body being generally horizontal and planar and including a ridge across the said width of said rear portion and protruding perpendicularly away from said lower surface of said elongate body, whereby said ridge may register with a portion of the sickle bar and thus properly align and maintain the spatial relationship between the finger-like front portion of the hold-down and the sickle guard.

9. The mowing device of claim 8, wherein:

said hold-down is a forging.

10. The mowing apparatus of claim 1, further including a plurality of hold-downs, one associated with each sickle guard, each said hold-down comprising:

an elongate body having a finger-like tapered front portion, and an opposing generally rectangular box-like rear portion with a width, a top surface and an opposing bottom surface, said front portion including a lower generally horizontal planar surface corresponding to part of said bottom surface and adapted to align with a sickle guard and knife element;

at least one hole through said elongate body for affixing the hold-down to a sickle bar; and said bottom surface of said rear portion of said elongate body being generally horizontal and planar and including a ridge across the said width of said rear portion and protruding perpendicularly away from said lower surface of said elongate body, whereby said ridge may register with a portion of the sickle bar and thus properly align and maintain the spatial relationship between the finger-like front portion of the hold-down and the sickle guard.

11. The hold-down of claim 10, wherein:

said hold-down is a forging.

* * * * *